United States Patent [19]
Miracle et al.

[11] Patent Number: 4,975,916
[45] Date of Patent: Dec. 4, 1990

[54] CHARACTER SNYCHRONIZATION

[75] Inventors: Gerald H. Miracle, Pleasant Valley; Richard A. Neuner, Port Ewen; Lee H. Wilson, Poughkeepsie, all of N.Y.

[73] Assignee: International Business Machines Corporation, Armonk, N.Y.

[21] Appl. No.: 225,106

[22] Filed: Jul. 26, 1988

[51] Int. Cl.$^5$ .................. H03M 7/14; H03M 9/00; H04L 7/02
[52] U.S. Cl. .................. 371/47.1; 341/58; 341/94; 341/100; 371/55; 375/110
[58] Field of Search ............. 371/47.1, 55, 57.1; 341/58, 94, 100; 375/110, 106

[56] References Cited

U.S. PATENT DOCUMENTS 4,366,478 12/1982 Masuda et al. .................. 340/825
4,486,739 12/1984 Franaszek et al. ............... 340/347

OTHER PUBLICATIONS

U.S. patent application, S#07/114,178, filed 10/29/87, "Serializer/Deserializer Circuit".
IBM Technical Disclosure Bulletin, vol. 28, No. 12, May 1986, pp. 5577-5579, to L. Skarshinski, "Character Synchronization Method".
IBM Technical Disclosure Bulletin, vol. 19, No. 8, Jan. 1977, pp. 3139-3143, to Lynch et al., "Serial Channel to I/O Interface".

Primary Examiner—Jerry Smith
Assistant Examiner—Stephen M. Baker
Attorney, Agent, or Firm—Robert L. Troike

[57] ABSTRACT

A system for bit character synchronization of an 8/10 bit code being deserialized is provided by a deserializer with a skip bit function input used to move a character boundary one bit at a time, and 8/10 code error detector, a zero disparity character detector and skip pulse generator. After character sychronism is lost, the skip pulse generator is permitted to generate a skip pulse if the following sequence occurs: all bits of the old character boundary have been flushed through the logic circuits, at least one non-zero disparity character has been detected, and an 8/10 code error is detected. After character synchronism is re-acquired, then the skip pulse generator is no longer permitted to generate a skip pulse.

11 Claims, 7 Drawing Sheets

FIG. 1

| CHAR BNDY | BIT0 | BIT1 | BIT2 | BIT3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | a | b | c | d | e | i | f | g | f | i | a | j | b | c | d | e | i | f | g | f | i |
| 1 | j | c | d | e | i | f | g | f | i | a | j | b | c | d | e | i | f | g | f | i | a |
| 2 | f | b | c | d | e | i | f | g | f | i | a | j | b | c | d | e | i | f | g | f | i |
| 3 | g | a | b | c | d | e | i | f | g | f | i | a | j | b | c | d | e | i | f | g | f |
| 4 | f | j | b | c | d | e | i | f | g | f | i | a | j | b | c | d | e | i | f | g | f |
| 5 | i | f | a | b | c | d | e | i | f | g | f | i | a | j | b | c | d | e | i | f | g |
| 6 | e | g | j | a | b | c | d | e | i | f | g | f | i | a | j | b | c | d | e | i | f |
| 7 | d | f | f | j | a | b | c | d | e | i | f | g | f | i | a | j | b | c | d | e | i |
| 8 | c | i | g | f | j | a | b | c | d | e | i | f | g | f | i | a | j | b | c | d | e |
| 9 | b | a | f | g | f | j | a | b | c | d | e | i | f | g | f | i | a | j | b | c | d |

CHARACTER SNYCHRONIZATION

BACKGROUND OF THE INVENTION

1. Field of the Invention

This invention relates to character synchronization of a serial code and more particularly to determining the byte boundary of a serial code.

Primary purpose of transmission codes is to transform the frequency spectrum of a serial data stream so that clocking can be recovered readily and a.c. coupling is possible. The code must also provide special characters outside the data alphabet for a function such as character synchronization, frame delimiters and perhaps abort, reset, idle, diagnostics, etc. Codes are also used often in combination with signal waveform shaping to adapt the signal spectrum more closely to the specific channel requirements. In most cases a reduction in bandwidth by constraints on both the high and low frequency components is desirable to reduce distortion in the transmission media, especially electromagnetic cables, or in the band limited receiver, and reduce the effects on intrinsic noise.

For fiber optic links and wire links, interest centers for many reasons on the family of two-level codes. For wire lengths one prefers the code with no d.c. and little low frequency content in order to d.c. isolate the transmission line for the driver and receiver circuitry, usually by transformers, and to reduce signal distortion on the line. Although these factors do not apply to fiber optic cases, good low frequency characteristics of the code are helpful for a number of reasons.

The high gain fiber optic receivers need an a.c. coupling stage near the front end. The control of the drive level, receiver gain, and equalization is simplified and the precision of control is improved, if it can be based on the average signal power, especially at top rates. D.C. restore circuits tend to lose precision with rising data rates and cease to operate properly below the maximum rates for other circuits required in a transceiver. Finally, if the time constants associated with the parasitic capacitances at the front end of a receiver are comparable to or longer than a baud interval, a signal with reduced low frequency content will suffer less distortion and will enable many links to operate without an equalizing circuit.

The Manchester and related codes are simple two-level codes and solve the clocking and low frequency problems as well. They translate each bit into two bits for transmission and are a good choice whenever the high clocking rates cause no problems in logic or analog circuits, the transducers or on the transmission line. They also reduce the data transmission rate by a factor of two since they encode 2 bits for every data bit.

Simple 5 bit/6 bit codes translates 5 binary bits into 6 binary bits and raise the number of information bits transmitted per baud interval to 0.833. Unfortunately, the implementation of a 5 bit/6 bit code in a byte-oriented (8 bit) system causes burdens in complexity. It is for this reason that an 8-bit/10-bit (8/10) partitioned block transmission code invented by Franaczek et al. and described in U.S. Pat. No. 4,486,739 assigned to the same assignee as the present invention is highly desirable when dealing with an 8-bit system. This patent is incorporated herein by reference. In this system a binary d.c. balance code encoder circuit for effecting the same is described which translated the 8-bit byte of information into 10 binary bits for transmission over electromagnetic or optical transmission lines subject to timing and low frequency constraints. The significance of this code is that it combines the low circuit count for implementation with excellent performance near the limits and measured with respect to the criteria. The 8-bit/10-bit code is partitioned into a 5-bit/6-bit block plus a 3-bit/4-bit block code which when used in concert allow a byte of data plus a control bit called the "K" bit to be encoded into 10 bits. In applications where the resulting encoded data is put into a serial data stream, the data is put into the serial data stream with the least significant bit going first. The receiver of this serial data will have to figure out where each of the 10 bits of the code lie in the serial data stream. It turns out there are ten possible place -which are referred to as "character boundaries" where the group of 10 bits may lie. If this character boundary is incorrectly determined then the receiver of the serial data will build its ten bits to decode from the bits of two different 8/10 characters. Consequently, incorrect data will be received and many 8/10 errors will result since the incorrectly acquired 8/10 character will not follow the rules of the 8/10 code in a consistent fashion.

In codes such as biphase, Manchester or NRZI the bits are encoded bit by bit, not in groups. The concept of character boundary does not mean anything for biphase, Manchester, and other bit oriented codes.

In the 8/10 code, one must establish a character boundary before one can successfully decode 8/10 characters. Therefore, special attention must be paid to how the appropriate character boundary can be found in a reliable fashion.

The invention by Widmer and Franaczek found the 8/10 code boundary by looking for five contiguous 1's in the serial data stream. There are two valid 8/10 characters that have five contiguous 1's in them called K28.5 and K28.7. The circuit required to achieve character synchronization on five contiguous 1's proved to be troublesome from a timing perspective and it consumed considerable power and/or considerable circuitry depending on which of several implementations are pursued.

It is therefore highly desirable to find some new means for determining the byte boundaries in the bits being deserialized.

SUMMARY OF THE INVENTION

In accordance with one embodiment of the present invention a system for determining the character boundary of a serial code comprises a code coupler for coupling a character number of bits with a skip bit function input used to move the character boundary one bit at a time, a code error detector, a zero disparity character detector and a skip bit generator. The skip bit generator is responsive to the presence of a code error for providing a skip signal to the coupler to move the character boundary one bit at a time and responsive to the presence of a detected zero disparity character for disabling said skip signal to the coupler to maintain the bit boundary.

DESCRIPTION OF THE DRAWINGS

FIG. 1 is a chart indicating the ten possible character boundaries for the 8/10 code;

DESCRIPTION OF THE PREFERRED EMBODIMENT

In the 8/10 code there are ten possible character boundaries. In the code such as biphase, Manchester or NRZI the bits are encoded bit-by-bit (not in groups). In 8/10 code, we encode bits a byte at a time. A byte in this case consists of eight data bits plus a control bit defined in the 8/10 code as the "K" bit. In the 8/10 code we must establish a character boundary before we can successfully decode 8/10 characters. Since encoded 8/10 characters are ten bits long, the appropriate character boundary can lie in any one of ten positions in the serial data stream.

The ten bits of an 8/10 encoded data stream are referred to as:

abcdeifghj where a is the least significant bit and the first to arrive at the deserializer and j is the most significant bit and the last to arrive at the deserializer. FIG. 1 shows the ten ways these bits can be arranged in the serial data stream in any 20-bit snapshot of the serial data stream.

For an 8/10 character to be correctly decoded and check out as a valid character in a consistent fashion, the 8/10 decoder needs to receive the 10 bits with the "a" bit in the least significant bit position and the other nine bits alongside it and in their correct positions with respect to "a".

According to the present invention the character synchronization boundary is determined by hunting through all of the ten possible character boundaries one at a time until a boundary is found where error-free 8/10 data was seen for an extended period. In this technique, one proceeds to each new character boundary by moving the 10 bits decoded over by 1 bit in the incoming data stream. The new character is tested for a zero disparity character and error code violations. As mentioned previously these 10 bit characters are partitioned into 6 bit followed by 4 bit blocks. A character's disparity is determined by the number of logic 1's compared to number of logic 0's in each block. A block with equal logic 1's and 0's has zero disparity except for the D.7 6-bit sub-block and the D/K.X.3 4-bit sub-block. A block with more 1's than 0's has positive disparity and a block with less 1's than zeros has negative disparity. The character disparity is zero if both its 6-bit and 4-bit blocks taken individually have an equal number of ones and zeros and the 6-bit block is not equal to D.7 and the 4-bit block is not equal to D/K.X.3. Block disparity is represented by D0 in Table 1 of U.S. Pat. No. 4,486,739. Running disparity is the disparity after each bit, and can vary within the range of −3 to +3 to avoid a disparity error. The running disparity after both the 6-bit and 4-bit blocks must equal +1 or −1 to avoid a disparity error. Running disparity at the beginning of each block or character is represented by D-1 in Tables 1, 2 and 3 of U.S. Pat. No. 4,486,739.

Figure 2:
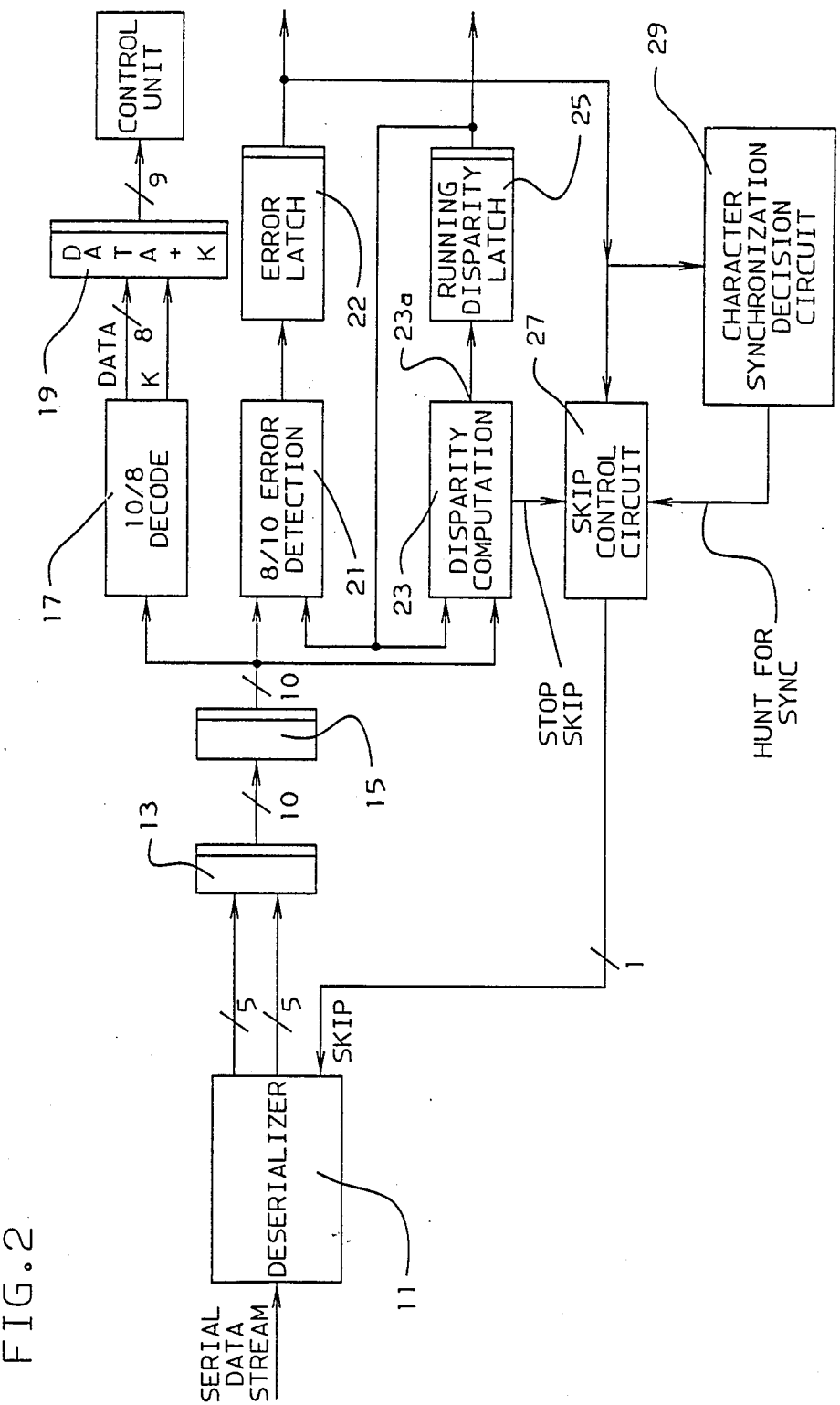
FIG. 2 is a block diagram of the character synchronization system in accordance with one embodiment of the present invention.

Referring to FIG. 2, the deserializer 11 is of the type which has a skip function input which changes its character boundary one bit at a time when a skip pulse is applied as shown. For more details of such a deserializer, see applicants' referred to U.S. Pat. No. 4,901,076 entitled "Serializer/Deserializer Circuit" H. O. Askin et al., a copy of which is provided herewith as U.S. Pat. No. 4,901,076 is incorporated herein by reference. The output of the deserializer is coupled to two parallel five place parallel registers 13 which in turn are coupled to a ten bit parallel register 15. The output from register 15 is then coupled to the 8/10 bit decoder 17 producing 8 bit and K bit outputs. The output of the decoder is passed to unit 19 which produces conventional bus and tag control bits which can be coupled for example to a control unit.

In the system described above the serial signals to the deserializer may be sent, for example, from a serial bus line of the electromagnetic or optical type and the input of the deserializer may include an optical electromagnetic receiver of conventional type. The input signals may be sent for example from a computer which itself transmits serial signal or in the alternative may be conventional parallel bus and tag bits which are serialized by a serializer well known in the state of the art. Such serializers and deserializers are well known in the state of the art. One such serializer system using serializers and deserializers is the 3044 Fiber-Optic Channel Extended Link Models C01 and D01 product of IBM Corporation. Also Masuda et al. U.S. Pat. No. 4,366,478 or Milligan U.S. Pat. No. 4,642,629 incorporated hereby by reference are systems using serializers and deserializers. The character synchronization described in the subject application may be used for character synchronization in the decoder of co-pending U.S. Patent Application, "Serial Data Communications System", filed Jul. 21, 1988, J. J. Kubik et al. The output of register 15 is also coupled to an 8/10 error detector 21. The output of the 8/10 error detector is held in latch 22. The output from the register 15 is also coupled to an 8/10 bit disparity computation unit 23. The running disparity is coupled or held in a disparity latch 25. The outputs from the error detector and the disparity computation are coupled to skip control signal generator 27.

The output from the skip control signal generator is applied as the skip control signal to the skip control input of the deserializer 11. The skip control generator circuit is shown in FIG. 3.

Figure 3:
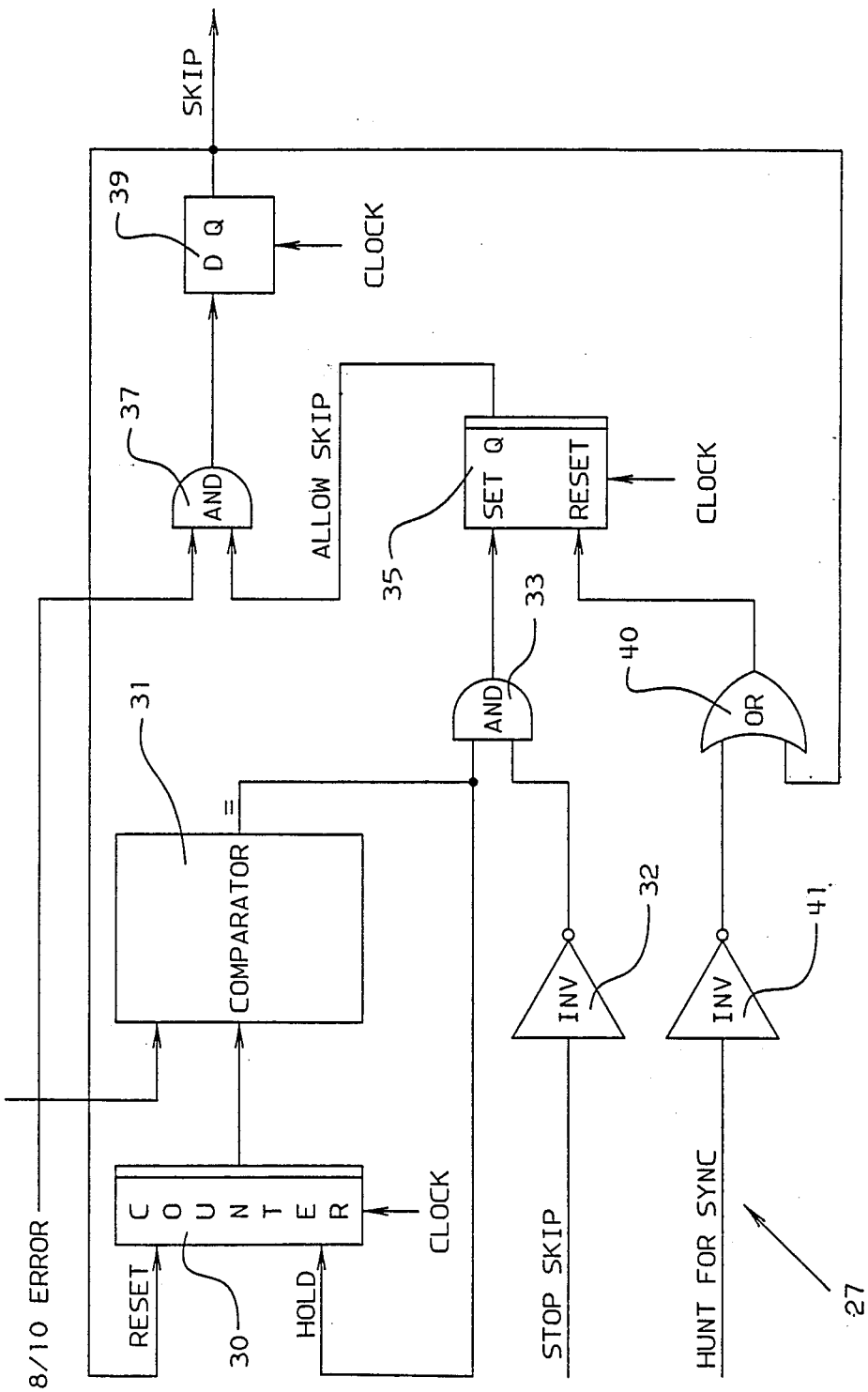
FIG. 3 is a skip control circuit for FIG. 2.

Referring to FIG. 3, the skip control generator circuit 27 includes a counter 30 and comparator 31 for producing a logic 1 level signal when the counter 30 has detected a predetermined number of machine cycles (x cycles) following reset which occurs when a new skip signal is provided to the deserializer. The number of cycles (x) is equal to the number of system clock pulses it takes to flush out the bits from the old character boundary so that the circuitry is using bits from the new character boundary. This may take for example three system clock pulse. This logic "1" level from comparator 31 provides one input to AND gate 33. Referring to FIG. 2, the disparity computation circuit 23 has two outputs. This first output provides the running disparity and provides a running disparity to latch 25. The second output presents a signal (stop skip) if there is a zero disparity character. Referring to FIG. 3, the output from disparity computation is inverted at inverter 32 and applied to the AND gate 33 to enable the AND gate 33 when there is not a zero disparity character. In other words when the character disparity is positive or negative. The enabled output from AND gate 33 sets latch 35 to provide an enable to AND gate 37. AND gate 37 when enabled couples any error signal from 8/10 error detector to enable skip latch 39 and provide a skip signal to the deserializer, reset the counter 30 and reset the allow skip latch 35 via OR gate 40.

Figure 6:
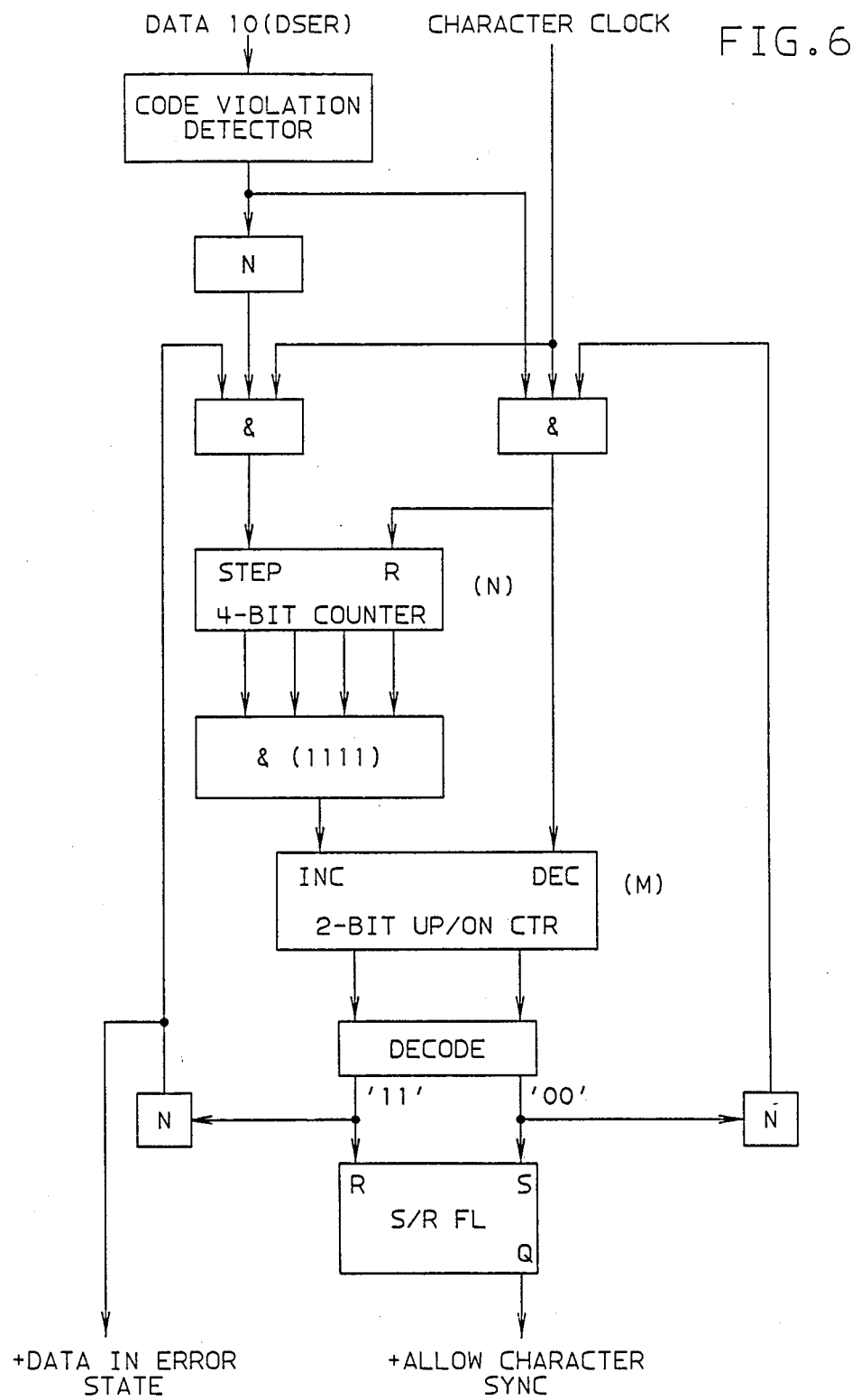
FIGS. 6 and 7 are the logic and flow chart, respectively, of the character sychronization decision circuit of FIG. 2.
Figure 7:
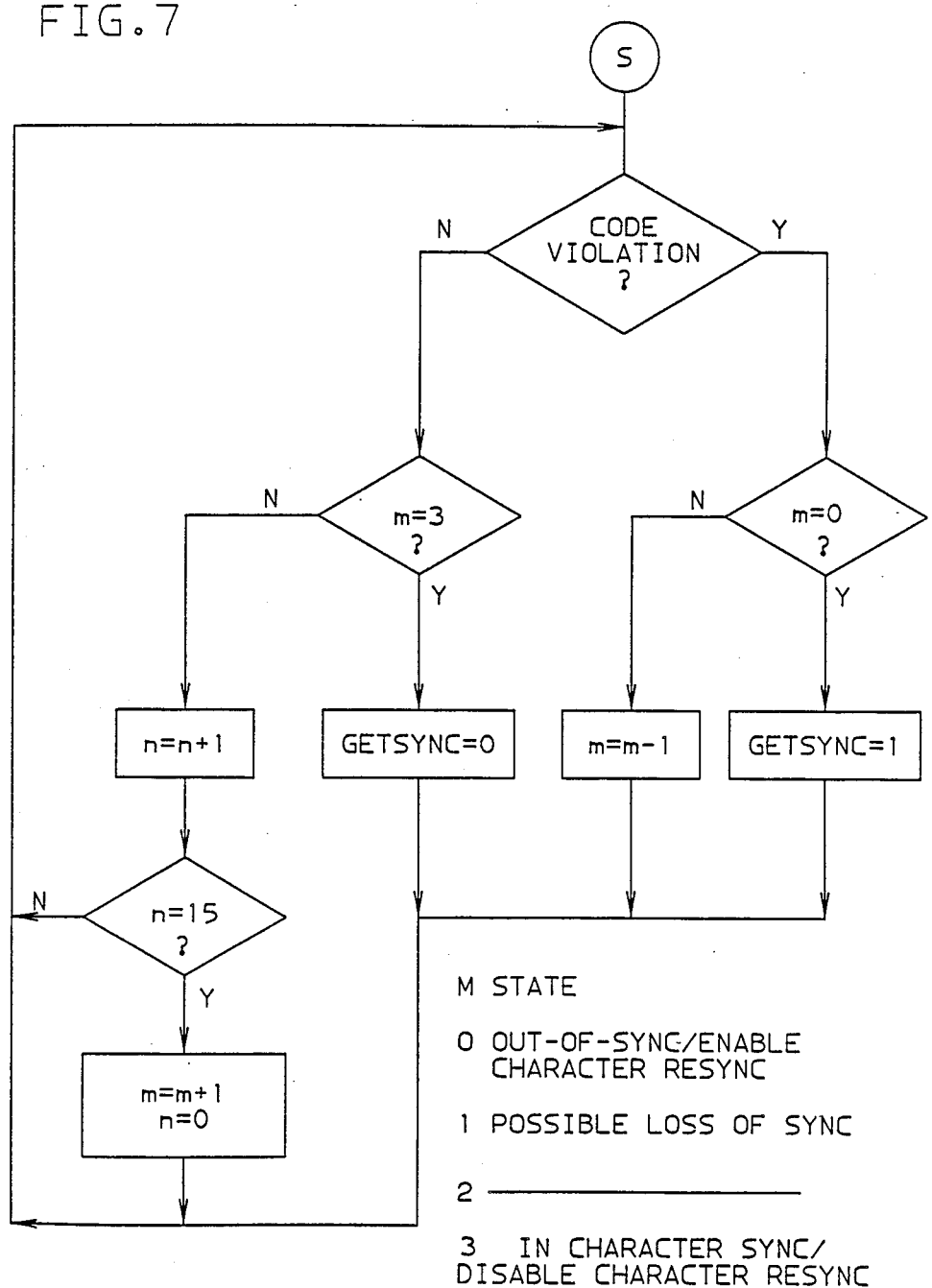

As shown in FIG. 2, the system includes a character synchronization decision circuit which when this decision circuit decides that the character boundary is lost provides a "hunt for sync" signal to FIG. 3. The "hunt for sync" is inverted by inverter 41, degating OR gate 40, which stops resetting latch 35, allowing latch 35 to set to permit the skip function. This character synchronization circuit 29 is described by Leon Skarshinski in IBM Technical Disclosure Bulletin Vol. 28, No. 12, May 1986 entitled "Character Synchronization Method". The referenced "allow character sync" signal is the "hunt for sync" signal. A copy of this IBM Technical Disclosure Bulletin follows. FIGS. 6 and 7 are from that Technical Disclosure Bulletin.

"A problem in implementing a serial protocol with run-length-limited code is to reliably determine when character synchronization is lost, and when it is reacquired. This is because the high-speed logic if allowed, will reset the character clock every time that a predetermined character is encountered, potentially slivering character clocks and producing unexpected results in low speed logic. A loss of character synchronization poses a problem only when a frame being received and processed by a port; this loss of sync at the beginning of a long frame will not be noticed until a frame trailer or an idle sequence is encountered.

The proposed method uses code violation statistics to recognize when the character clock is aligned with the incoming characters.

Misalignment of the character clock and the data will produce code violations with a probability p(cv). An examination of a few characters shows that this probability is about 0.5 for a string of data and is close to 1.0 for an idle string. The method discussed will work well with a long string of data and, therefore, will also work for any other string in a selected code.

Given N and M counters, the N counter would count up to N character clock cycles when started by a code violation. If no additional code violations are detected during this time, the M counter would be incremented; if a code violation is encountered, the N counter is reset and the M counter is decremented. (The M counter cannot increment through all '1' state and cannot decrement through the all '0' state.) The state of the M counter would indicate in or out of character synchronism, as shown below:

| all 0's --------out of sync | / data error |
| some '1's ------sycn ?? | / Code Violation error |
| | / when changed from all |
| | / '1's |
| all '1's -------in sync | / data OK |

Whenever the M counter decrements from the all '1' state, a code violation error is signaled to a controller and the state of the port logic is frozen while it is read out and logged by the controller. No additional requests to the matrix controller will be generated by the port in this state. The port will be freed when the M counter returns to the all '1' state and the controller resets the code violation indicator.

Whenever the M counter reaches the all '0' state, the high speed character clock counter will be permitted to reset on idle characters, thereby resynchronizing the character clock. (Alternatively, the character counter may be allowed to either skip or add one count; then the M and N counters would again test for character synchronization.)

When the M counter reaches the all '1' state, this permission will be removed. This method ensures that the character clock will not sliver until resynchronization is allowed.

It would appear that M=3 and N=7 will be sufficient to allow reliable character synchronization. N=15 would be marginally better in detecting and acquiring character synchronization but at the expense of longer acquisition time (45 characters vs. 21). Use of M=15 allows p(cv) to be as low as 0.26 and still produce the same performance as shown above for M=7 and p(cv)=0.5."

The ten bits of the 8/10 encoded data stream are referred to as a, b, c, d, e, i, f, g, h, j where a is the least significant bit and the first to arrive at the deserializer and j is the most significant bit and the last to arrive at the deserializer. The disparity computation unit 23 determines disparity according to the following symbols.

&=logical AND
|=OR
+=arithmetic add
^=not

The disparity computation may be made of logic circuits to perform these functions directly or may be provided by a program in a microprocessor in connection with a processor that performs these computations. Note also that the output from running disparity positive (+) or negative (−) is coupled back to the input of the 8/10 error detector 21 and the disparity computation circuit 23.

The running disparity computation circuit or program is built with the following definition:

d7000111=( ^a)&( ^b)&( ^c)&(d)&(e)&(i);
d7111000=(a)&(b)&(c)&( ^d)&( ^e)&( ^i);
dkx3p=( ^f)&( ^g)&(h)&(j);
dkx3m=(f)&(g)&( ^h)&( ^j);
positive=disp;
negative= disp;
sumai=a+b+c+d+e+i;
sumfj=f+g+h+k;
disp=(sumfj=3)|(sumfi=4)|(dkx3p)|, ((sumfj=2)& dkx3m&d7000111)|, ((sumfj=2)&(sumai=4)|(sumai=5)|(sumai=6))& ^dkx3m)|, (positive&(sumai=3)&(sumfj=2)& ^d7111000).

These definitions with logic AND's (&), logic OR's (|), arithmetic add (+) and not ( ) may be in a program form following what is written or by circuits designed following these definitions and logic. For example, " ^ a " means "not a".

Similarly, 8/10 error detector detects errors on the basis of positive and negative running disparity from said running disparity and the 8 bit code according to the following definitions and logic:

k28p=( ^a)&( ^b)&(c)&(d)&(e)&(i);
k28m=(a)&(b)&( ^c)&( ^d)&( ^e)&( ^i);
k23p=(a)&(b)&(c)&( ^d)&(e)&( ^i);
k23m=( ^a)&( ^b)&( ^c)&(d)&( ^e)&(i);
k27p=(a)&(b)&( ^c)&(d)&(e)&( ^i);
k27m=( ^a)&( ^b)&(c)&( ^d)&( ^e)&(i);
k29p=(a)&( ^b)&(c)&(d)&(e)&( ^i);
k29m=( ^a)&(b)&( ^c)&( ^d)&( ^e)&(i);

k30p=(^a)&(b)&(c)&(d)&(e)&(^i);
k30m=(a)&(^b)&(^c)&(^d)&(^e)&(i);
d000111=(^a)&(^b)&(^c)&(d)&(e)&(i);
d111000=(a)&(b)&(c)&(^d)&(^e)&(^i);
i111100=(a)&(b)&(c)&(d)&(^e)&(^i);
i000011=(^a)&(^b)&(^c)&(^d)&(e)&(i);
dxp7p=(f)&(g)&(h)&(^j);
dxp7m=(^f)&(^g)&(^h)&(j);
dkya7p=(^f)&(g)&(h)&(j);
dkya7m=(f)&(^g)&(^h)&(^j);
dkx3p=(^f)&(^g)&(h)&(j);
dkx3m=(f)&(g)&(^h)&(^j);
d20=(^a)&(^b)&(c)&(^d)&(e)&(i);
d17=(a)&(^b)&(^c)&(d)&(e)&(i);
d18=(^a)&(b)&(^c)&(d)&(e)&(i);
d13=(a)&(^b)&(c)&(d)&(^e)&(^i);
d14=(^a)&(b)&(c)&(d)&(^e)&(^i);
d11=(a)&(b)&(^c)&(d)&(^e)&(^i);
positive=disp;
negative=^disp;
s1=negative&(d17|d18|d20);
s2=positive&(d11|d13|d14);
sumai=a+b+c+d+e+i;
sumfj=f+g+h+j;
error=i111000|i000011;
error=(k28p&dxp7m)|k28m&dxp7p)|error;
error=(negative&d000111)|positive&d111000)|error;
error=(^s1&^(k28m|k23m|k27m|k29m|k30m))|error;
error=(^s2&^(k28p|k23p|k27p|k29p|k30p))|error;
error=(s1&dxp7p)|error;
error=(s2&dxp7m)|error;
error=(negative&(sumai=3)&dkxp)|error;
error=(negative&(sumai=4)&dkx3m)|error;
error=(positive&(sumai=3)&dkx3m)|error;
error=(positive&(sumai=2)&dkx3p)|error;
error=(sumai=0)|(sumai=1)|(sumai=5)|(sumai=6)|error;
error=(sumfj=0)|(sumfj=4)|error;
error=((sumai=2)&(sumfj=1))|error;
error=((sumai=4)&(sumfj=3))|error;
error=((sumai=4)&positive)|error;
error=((sumai=2)&negative)|error;
error=((sumai=3)&(sumfj=3)&positive)|error;
error=((sumai=3)&(sumfj=1)&Negative)|error.

Figure 4:
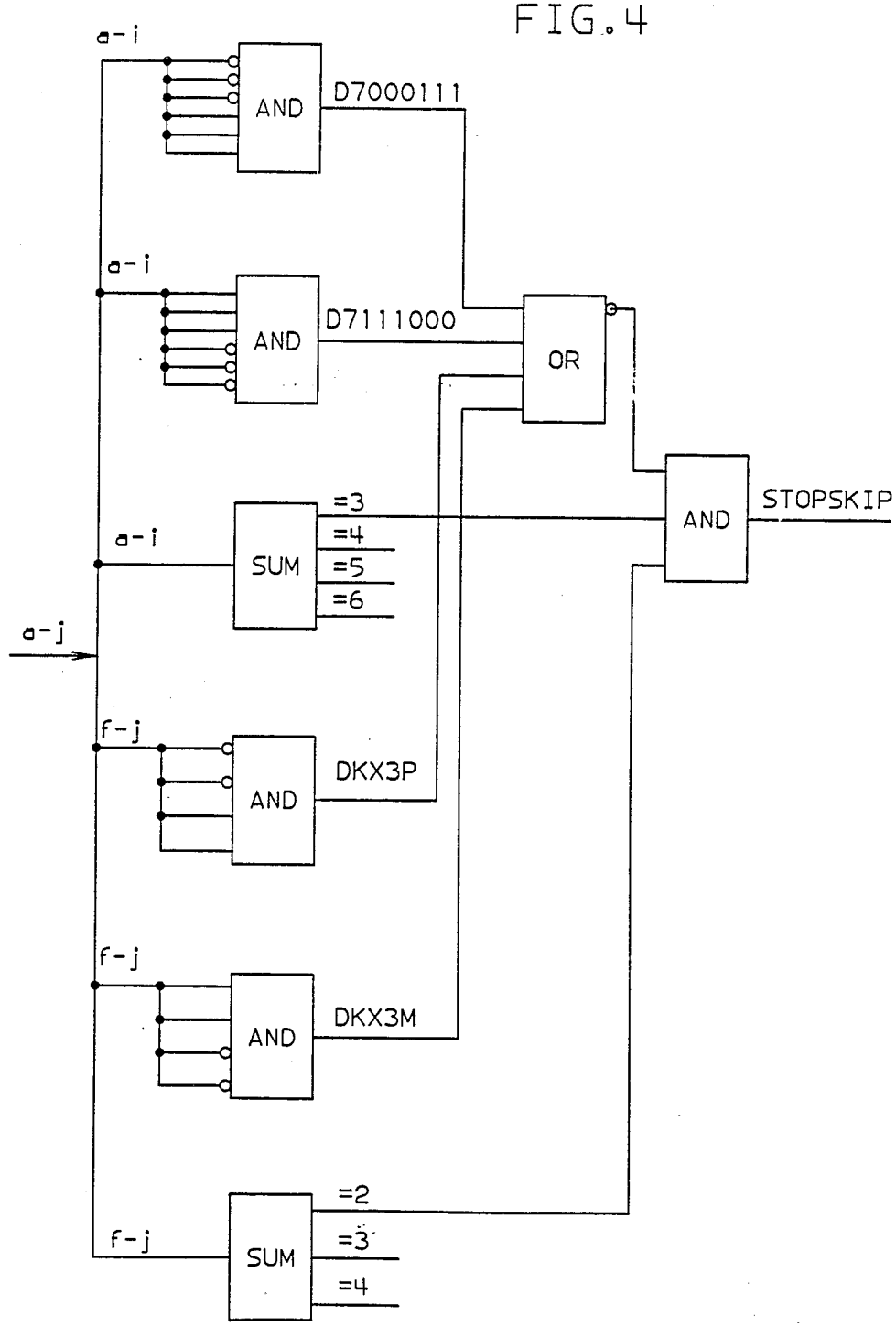
FIG. 4 is a logic block diagram for detecting 5/6 and ¾ bit blocks which have character disparity of zero.

The detection of zero character disparity which produces the stop skip signal is based on the following definitions and equations. They can be programs in a processor or as shown in FIG. 4 by a logic circuit following the equations.

d7000111=(^a)&(^b)&(^c)&(d)&(e)&(i);
d7111000=(a)&(b)&(c)&(^d)&(^e)&(^i);
dkx3p=(^f)&(^g)&(h)&(j);
dkx3m=(f)&(g)&(^h)&(^j);
sumai=a+b+c+d+e+i;
sumfj=f+g+h+j;
stopskp=((sumai=3)&(sumfj=2)&^(dkx3m|d7111000, |dkx3p|d7000111)).

Figure 5:
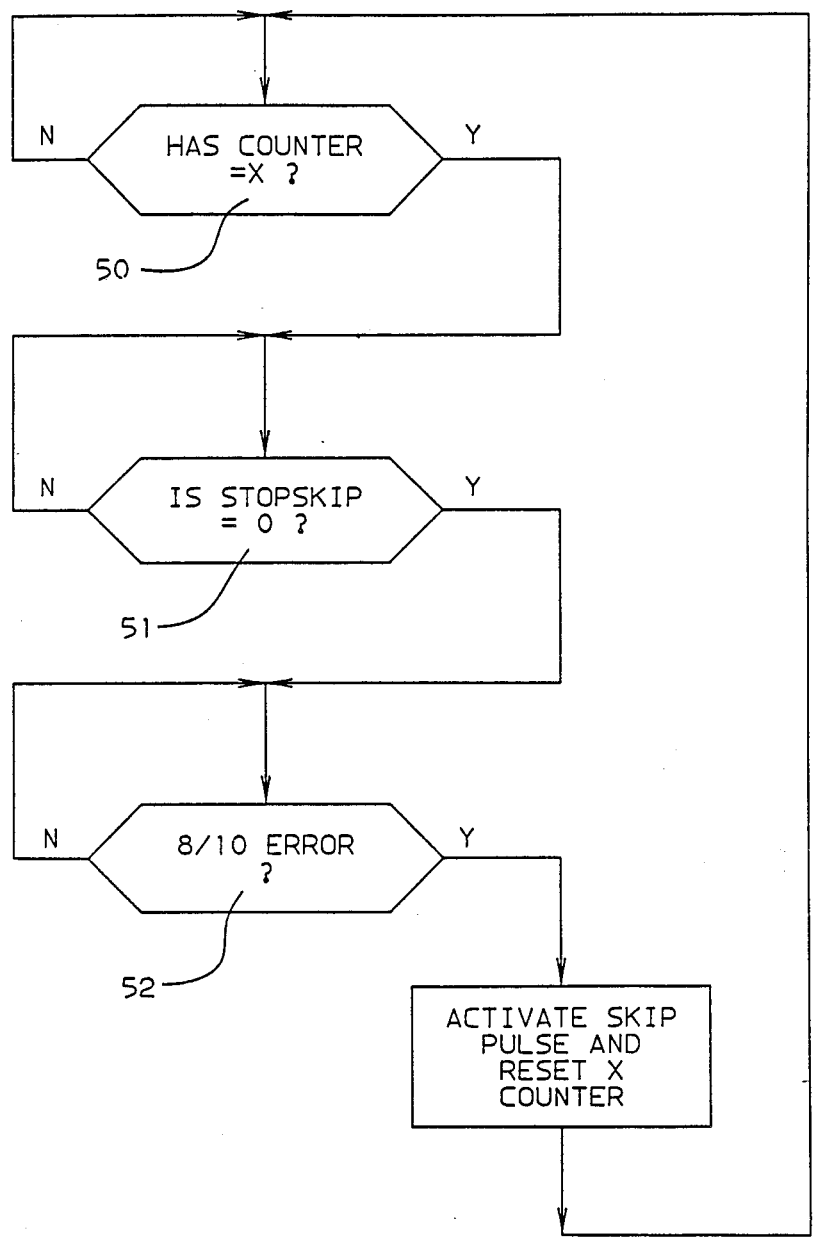
FIG. 5 is a flow chart useful for describing the operation of the present invention.

The following is the operation of the system described above with the aid of the flow chart of FIG. 5. When the character synchronization decision circuit 29 detects the presence of detected errors from error detector 21 it provides a "hunt for sync" signal to the skip control circuit 27 which enables the skip control circuit. When the "hunt for sync" is not present the inverted signal always provides a reset to latch 35 which disables code error signal at AND gate 37. The counter 30 is reset to start the count and the counter begins to count machine clock signals. When the number of clock pulses after reset equals X or the number required to flush out the old character boundary and present a new character boundary the comparator 31 holds the counter and provides an input signal to AND gate 33. This is represented by the Y output of decision block 50 of FIG. 5. In accordance with the teaching herein a test for zero disparity character is made using a zero disparity character detection circuit. If there is true positive or negative disparity the latch 35 is set to present an enable signal to AND gate 37. This is represented in FIG. 5 by decision in block 51. When the character disparity is known and is positive or negative the 8/10 code violation represented by Y at decision block 52 produces a skip pulse to the deserializer. If there is not an 8/10 violation, there is no skipping as represented by decision N in block 52.

While we have illustrated and described preferred embodiments of our invention, it is to be understood that we do not limit ourselves to the precise construction herein disclosed and the right is reserved to all changes and modifications coming within the scope of the invention as defined in the appended claims.

We claim:

1. A system for selecting the character boundary of a serial code comprising:
   means responsive to transmitted serial code for coupling a character number of bits to a utilization means, said coupling means responsive to a skip bit signal for moving the character boundary by one bit;
   means coupled to said coupling means and responsive to said character number of bits for detecting if there is a zero disparity character and a code error,
   skip signal providing means responsive to a code error for providing a skip signal to said coupling means in the presence of a detected code error; and
   means coupled to said skip signal providing means responsive to detection of a zero disparity character for inhibiting said skip signal.

2. The combination of claim 1 including timing means responsive to the presence of a new character boundary for inhibiting said stop skip signal until all the old character boundary data has cleared from the detecting means.

3. The combination of claim 1 including character synchronization decision circuit means coupled to said detecting means responsive to predetermined error algorithm for inhibiting said skip signal.

4. The combination of claim 1 wherein said code is partitioned into code blocks and said detecting means detects code errors and a zero disparity character.

5. The combination of claim 4 wherein said code is 8/10 bit code which is partitioned into 6 bit and 4 bit blocks.

6. A system for bit synchronization of 8/10 bit code signals partitioned into 6 bit and 4 bit blocks comprising:
   an 8/10 bit code deserializer with a skip bit function input which in response to a skip bit signal moves the character boundary one bit;
   disparity computation means responsive to deserialized 8/10 bit code for computing character disparity of positive, negative and zero and running disparity which can be only positive or negative after each block to provide a running disparity signal and a stop skip signal based on a zero disparity character;

an 8/10 bit code error detector responsive to said running disparity signal and said 8/10 bit code for providing an 8/10 bit code error signal indicative of 8/10 bit code errors, and skip signal producing means responsive to said disparity computation means and said error detector for providing a skip signal when there is an 8/10 bit code error signal and no detected stop skip signal.

7. A method for selecting the character boundary of a serial data stream comprising the steps of:

determining the absence of a zero disparity character;

detecting code errors; and shifting the character boundary of the serial data stream by one bit when there is absence of a zero disparity character and presence of detected code errors.

8. The method of claim 7 wherein the step of detecting code errors includes detecting the running disparity.

9. The method of claim 7 including as a preliminary step flushing out all bits of the old character boundary.

10. A method for selecting the character boundary of an 8/10 bit serial data partitioned into 6-bit and 4-bit blocks comprising the steps of:

determining the absence of a zero disparity character;

detecting code errors in said blocks; and shifting the character boundary of the serial data stream by one bit if a code error is detected after having been armed for shifting by the absence of a zero disparity character.

11. The method of claim 10 including as a preliminary step flushing out all bits of the old character boundary.

* * * * *